(12) United States Patent
Mason

(10) Patent No.: US 12,710,775 B2
(45) Date of Patent: Aug. 18, 2026

(54) WATER PRESSURE REGULATOR ASSEMBLY

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 18 days.

(21) Appl. No.: 18/427,895

(22) Filed: Jan. 31, 2024

(65) Prior Publication Data

US 2024/0264614 A1 Aug. 8, 2024

Related U.S. Application Data

(60) Provisional application No. 63/442,825, filed on Feb. 2, 2023.

(51) Int. Cl.
*G05D 16/06* (2006.01)

(52) U.S. Cl.
CPC ................................ *G05D 16/0636* (2013.01)

(58) Field of Classification Search
CPC .......... Y10T 137/7781; G05D 16/0636; G05D 16/063–065
USPC ................................ 137/494, 505–510, 512
See application file for complete search history.

(56) References Cited

U.S. PATENT DOCUMENTS 3,625,247 A * 12/1971 Dargatz ............ G05D 16/0655 137/505.11
3,814,543 A * 6/1974 Gritz ................. G05D 16/0658 251/210
3,931,830 A * 1/1976 Gritz ................. G05D 16/0658 137/513.5
4,171,004 A * 10/1979 Cerrato ............. G05D 16/0663 137/115.14
4,449,694 A 5/1984 Hobart et al.
4,478,617 A * 10/1984 Rees ...................... B60T 17/04 55/482
4,745,943 A * 5/1988 Mortensen ............... F16T 1/34 138/44
4,991,655 A 2/1991 McHugh
5,154,232 A 10/1992 McHugh
5,297,635 A 3/1994 McHugh
(Continued)

FOREIGN PATENT DOCUMENTS

CN 203395270 1/2014
CN 205781020 12/2016
(Continued)

OTHER PUBLICATIONS

The Plumber's Choice, "1-¼ in x 2 in SWT high flow drain ball valve, purge for pipe cleanout, 3-way adjustable flow path, brass," https://www.homedepot.com/p/The-Plumber-s-Choice . . . (Oct. 9, 2020).

(Continued)

*Primary Examiner* — Jessica Cahill
(74) *Attorney, Agent, or Firm* — PRICE. HENEVELD LLP

(57) ABSTRACT

A water pressure regulator assembly has dual union ends on a pressure reducing valve body. The water pressure regulator assembly includes a drain port with a valve member and a strainer. The union fitting ends may include check inserts to prevent backflow of water within the associated plumbing system.

20 Claims, 5 Drawing Sheets

(56) References Cited

U.S. PATENT DOCUMENTS 5,566,708 A 10/1996 Hobbs, Jr.
5,785,074 A 7/1998 Kieper
5,904,178 A * 5/1999 Bracey ............... G05D 16/0663 137/549
6,302,446 B1 10/2001 Spears et al.
6,397,878 B1 6/2002 Nolan
6,460,563 B2 10/2002 Olson et al.
6,655,412 B2 12/2003 Reck
7,306,010 B2 12/2007 Gruener, Sr.
7,393,935 B1 7/2008 Kirimura et al.
7,506,665 B2 3/2009 Gruener, Sr.
7,631,662 B2 12/2009 Reck
7,681,596 B2 3/2010 Reck
8,375,991 B2 2/2013 Erhardt
10,036,481 B2 7/2018 Reck et al.
10,458,662 B2 10/2019 Olsen et al.
10,571,039 B1 2/2020 Barrett
10,823,316 B2 11/2020 Lawrence et al.
2004/0124386 A1 7/2004 Carey
2004/0206404 A1 10/2004 Yang
2004/0261796 A1 12/2004 Butler
2005/0045226 A1 3/2005 Abe
2005/0109404 A1 5/2005 Fazekas
2006/0196567 A1 9/2006 Gruener
2008/0135794 A1 6/2008 Shnider et al.
2008/0164006 A1 7/2008 Karamanos
2008/0314466 A1 12/2008 Cimberio et al.
2008/0318079 A1 12/2008 Ballantyne et al.
2010/0252129 A1 10/2010 Olsen et al.
2010/0326531 A1 12/2010 Oltman et al.
2010/0326533 A1* 12/2010 Mooney ............... G05D 16/163 137/15.19
2011/0073201 A1 3/2011 Matsui et al.
2011/0247706 A1 10/2011 Wu
2011/0253922 A1 10/2011 Hughes et al.
2013/0008542 A1* 1/2013 Irwin .................... F16K 37/005 137/859
2014/0102559 A1* 4/2014 Grenaway ............ G05D 16/163 137/505
2014/0251474 A1 9/2014 Oltman et al.
2014/0261725 A1 9/2014 Oltman et al.
2015/0101684 A1 4/2015 Yoder
2015/0129043 A1 5/2015 Hughes et al.
2015/0323087 A1 11/2015 Al-Amri
2015/0369411 A1 12/2015 Kieper et al.
2016/0069483 A1 3/2016 Bobo et al.
2016/0084398 A1 3/2016 Reck
2016/0097550 A1 4/2016 Karamanos
2016/0138723 A1 5/2016 Al-Amri
2016/0178076 A1* 6/2016 Cellemme ............. F16K 15/063 137/512
2017/0002942 A1 1/2017 Yang et al.
2017/0089592 A1 3/2017 Olsen et al.
2017/0204979 A1 7/2017 Yoder et al.
2018/0156470 A1 6/2018 Olsen et al.
2019/0032801 A1 1/2019 Andersson
2019/0078695 A1 3/2019 Tanghetti
2019/0154160 A1 5/2019 Yoder et al.
2019/0170264 A1 6/2019 Roy, Jr. et al.
2019/0226592 A1 7/2019 Hussein et al.
2019/0301625 A1 10/2019 Ringer et al.
2020/0173569 A1 6/2020 Koch et al.
2020/0278066 A1 9/2020 Andersson et al.
2020/0347959 A1* 11/2020 Guise ................. G05D 16/0655
2022/0333360 A1* 10/2022 Burke ..................... E03B 7/075
2023/0142662 A1 5/2023 Aselton, II

FOREIGN PATENT DOCUMENTS

CN 106958670 7/2017
CN 207195715 4/2018
JP H7301351 11/1995
JP 202009902 6/2020

OTHER PUBLICATIONS

Watts, "Series RPVM1-Press residential purge" flier, Watts.com (© 2020 Watts).
Webstone, "Propal Series" Ball Drain Valve brochure, Webstone Company, Inc. (© 2016 Webstone).
Webstone, Pro-Pal Series Union Ball Drain, www.webstonevalves.com/default.aspx?page=customer&file=customer/wecoin/customerpages/unionballdrain.htm (2020).

* cited by examiner 7
9
7
91
7
91
90
9
S
80
91
7
80
S

WATER PRESSURE REGULATOR ASSEMBLY

CLAIM OF PRIORITY

The present application claims the priority benefits under the provisions of 35 U.S.C. § 119, basing said claim of priority on related U.S. Provisional Application No. 63/442,825 filed Feb. 2, 2023, which is incorporated in its entirety herein by reference.

FIELD OF THE INVENTION

The present invention relates to a dual union pressure reducing valve with removable check inserts and a serviceable strainer drain and associated methods.

BACKGROUND OF THE INVENTION

A water pressure regulator (sometimes called a pressure-reducing valve, or PRV) is a specialized plumbing valve that reduces the water pressure coming into the plumbing system through the main water line. A PRV valve brings down the pressure to a safe level before the water reaches any plumbing fixtures inside the building. Too much water pressure can cause many plumbing problems, so it is very important to keep the water pressure under control. Although it is not necessary for every plumbing installation, a water pressure regulator can be essential in situations where the municipal water supply enters the building at a very high pressure, or where water pressure is irregular.

Most home plumbing fixtures are designed to work best at a pressure of about 50 psi (pounds per square inch), but it is not uncommon for municipal water supplies to enter the home with pressures as high as 150 or 200 psi. If such high pressures is present on a regular basis, the strain can eventually cause joints to fail, faucets and other fixtures to leak, and appliances to break down. Clothes washers, dishwashers, and some other household appliances have built-in pressure regulators, but a whole-house water pressure regulator still offers protection to those appliances, and it also serves to protect all the pipes and fixtures throughout the house.

When the system is protected by a water pressure regulator, there is less stress on the inner valves of appliances, faucets and shutoff valves will be less likely to leak, and fluctuations in water pressure are evened out. Like all plumbing fixtures and valves, water pressure regulators eventually grow old and fail. The failure of the water pressure regulator can cause water hammering and/or variations or inconsistencies in water pressure. Moreover, if the regulator's adjustment screw no longer has an effect on changing the water pressure, the valve is due for replacement. However, replacement and/or service of typical water pressure regulators requires cutting the water pressure regulator out of the plumbing system. Moreover, sediment can build up in a water pressure regulator, affecting the functionality and/or lifespan of the water pressure regulator. Thus, a water pressure regulator assembly that reduces and/or removes debris from the water supply before entering the water pressure regulator and which is easy to remove from the plumbing system is disclosed herein.

SUMMARY OF THE INVENTION

One aspect of the present invention is a water pressure regulator assembly. The water pressure regulator assembly has a valve body with a fluid passageway between a first fitting end, a second fitting end, a drain port, a bell base, and a gauge port. A bell is coupled to the bell base. A spring is positioned within the bell with a diaphragm coupled to the spring. The diaphragm is coupled to a valve stem that is positioned within a stem opening in the bell base. A screen member is positioned within the drain port. The screen member includes a portion positioned in the fluid passageway adjacent to the first fitting end.

Another aspect of the present invention is a water pressure regulator assembly. The water pressure regulator assembly has a valve body having a fluid passageway between a first fitting end, a second fitting end, a drain port, and a bell base. A bell is coupled to the bell base. A spring is positioned within the bell and a diaphragm coupled to the spring. The diaphragm is coupled to a valve stem that is positioned within a stem opening in the bell base. A screen member is positioned within the drain port. The screen member includes a portion that is positioned in the fluid passageway adjacent to the first fitting end. A valve member is positioned on the drain port.

Yet another aspect of the present invention is a water pressure regulator valve assembly. The water pressure regulator valve assembly has a valve body having a fluid passageway between a first fitting end, a second fitting end, a drain port, and a bell base. A bell is coupled to the bell base. A spring is positioned within the bell and a diaphragm coupled to the spring. The diaphragm is coupled to a valve stem that is positioned within a stem opening in the bell base. A screen member is positioned within the drain port. The screen member includes a portion that is positioned in the fluid passageway adjacent to the first fitting end. A first fitting is coupled to the first fitting end and a second fitting is coupled to the second fitting end.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
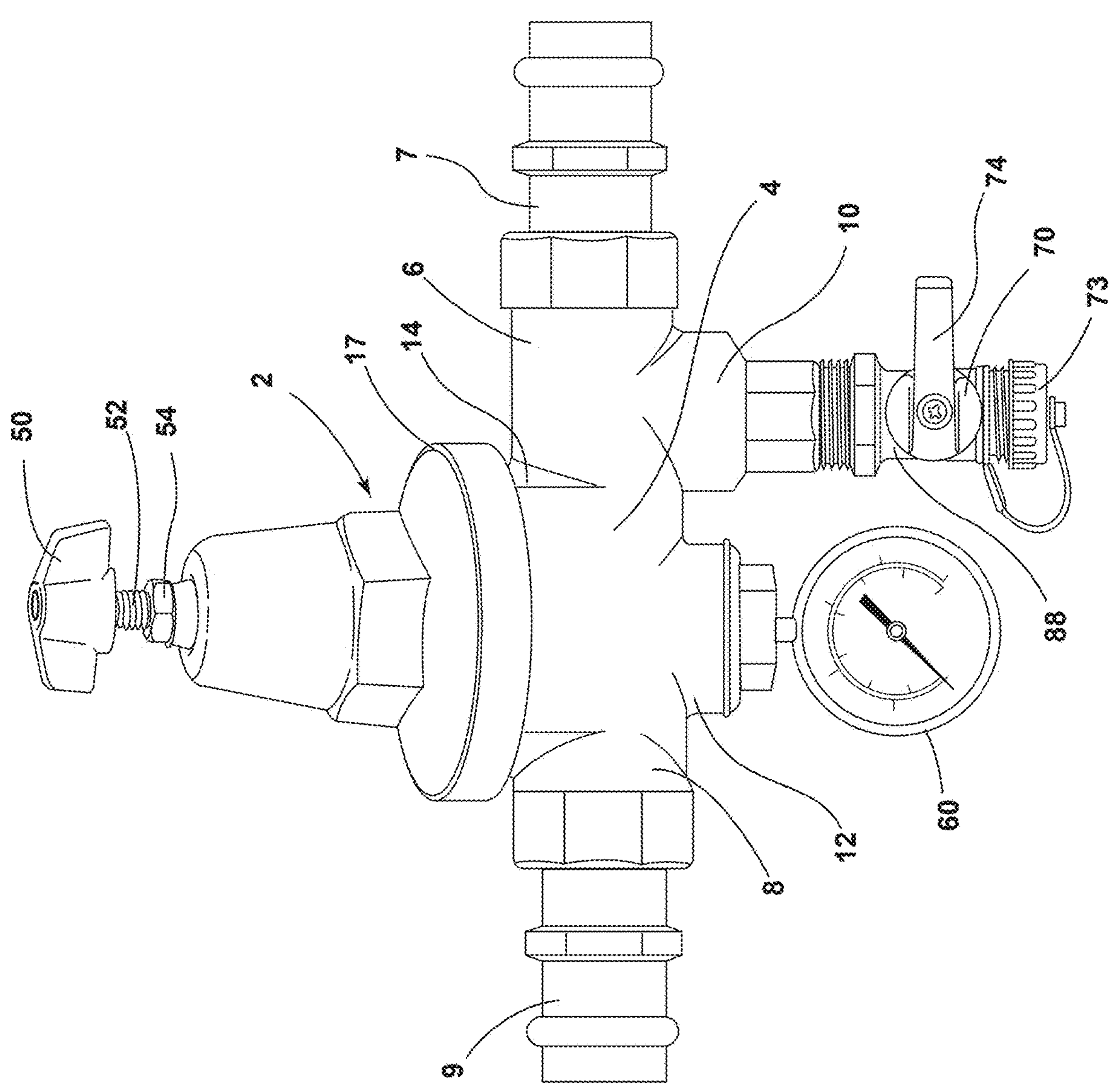
FIG. 1 is a front perspective view of one embodiment of a water pressure regulator assembly.
Figures 2, 3:
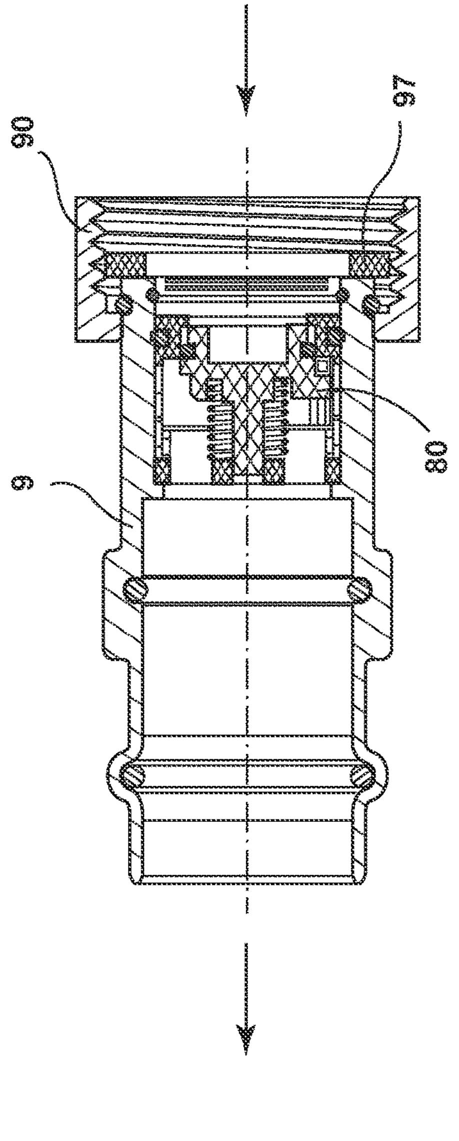
FIG. 2 is a cross-sectional view of an embodiment of the second fitting.
FIG. 3 is a cross-sectional view of an embodiment of the first fitting.
Figure 4:
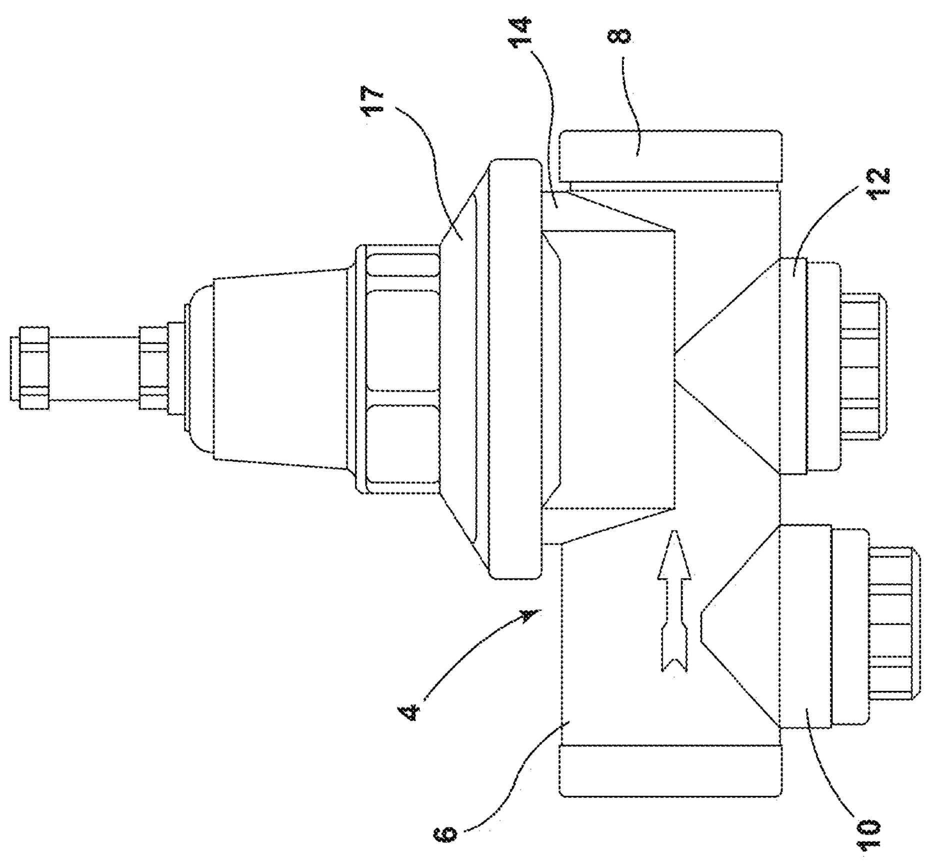
FIG. 4 is a front view of another embodiment of the valve body of a water pressure regulator assembly.
Figure 5:
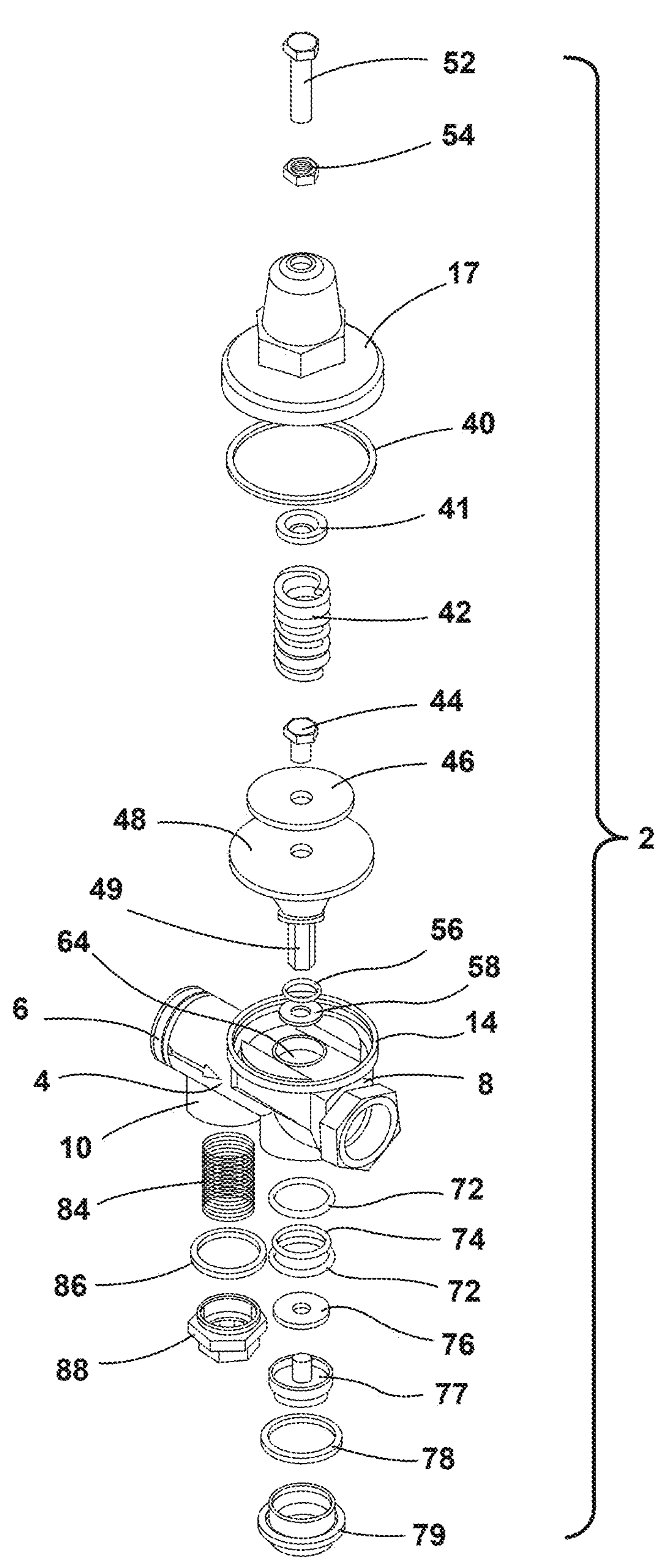
FIG. 5 is an exploded view of the components of the water pressure regulator assembly shown in FIG. 4.
Figures 6, 7, 8:
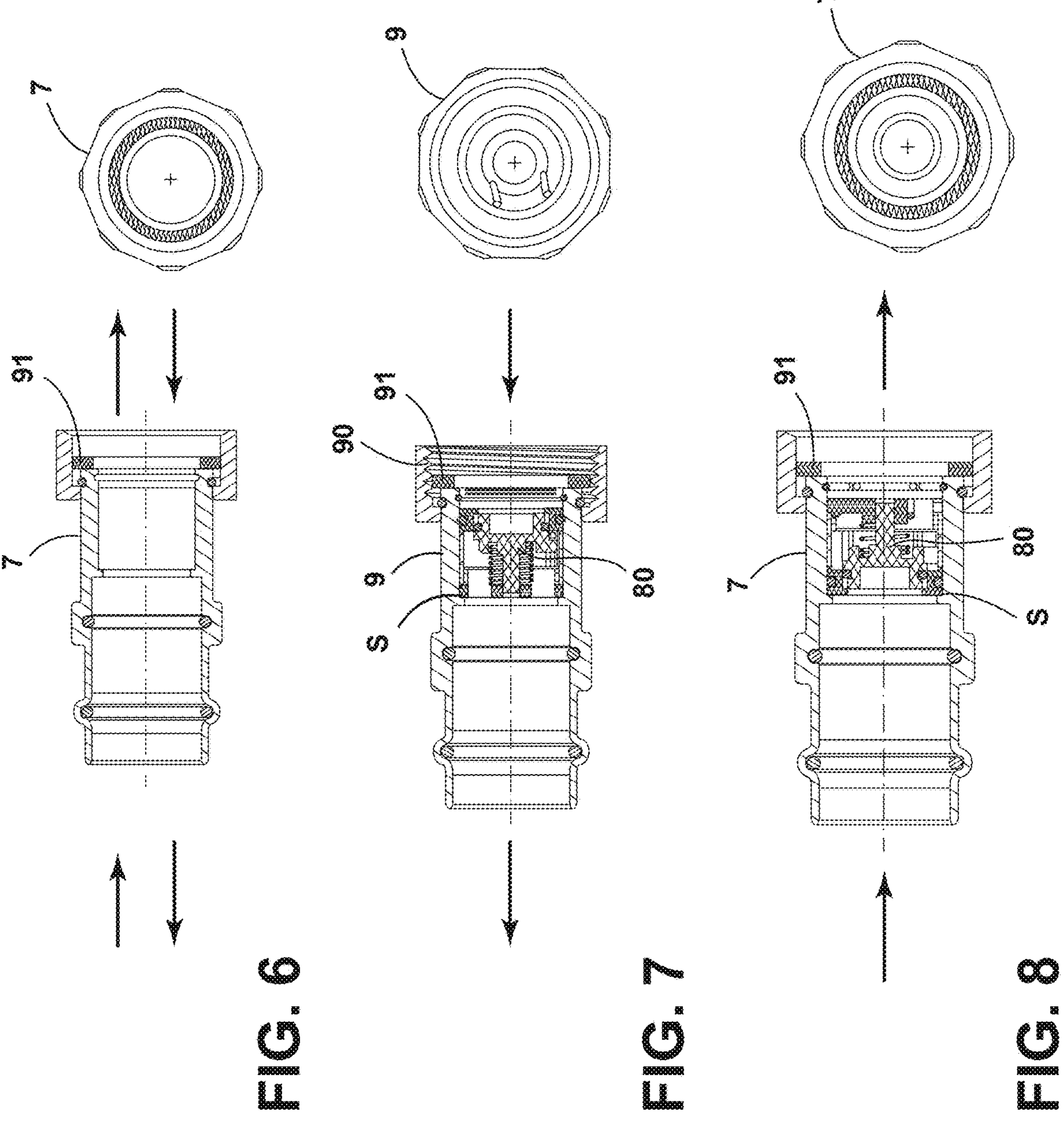
FIG. 6 is an embodiment of the first fitting.
FIG. 7 is an embodiment of the second fitting with a check valve insert.
FIG. 8 is an embodiment of the first fitting with a check valve insert.

A water pressure regulator assembly 2 is illustrated in FIG. 1. The water pressure regulator assembly 2 has a valve body 4 with a first fitting end 6, a second fitting end 8, a drain port 10, a gauge port 12, and a bell base 14. As illustrated in FIGS. 1, 4, and 5, a fluid passageway extends between the first fitting end 6 toward the second fitting end 8. The first fitting end 6 is illustrated as being positioned opposite the second fitting end 8. In addition, the bell base 14 is illustrated as being positioned opposite the gauge port 12. The drain port 10 is positioned adjacent to the first fitting end 6 on the valve body 4. However, the first fitting end 6, second fitting end 8, drain port 10, bell base 14, and gauge port 12 can be positioned in other orientations on the valve body 4.

A screen 84 is positioned within the drain port 10. The screen 84 will screen the water that enters into the valve body 4 before it reaches the bell base 14. Thus, debris and other material in the water can be reduced or eliminated before reaching the diaphragm 48. A gasket 86 can be positioned adjacent to the first bonnet 88 that closes the drain port 10. In addition, in some embodiments, a valve member 70 can be included either on the drain port 10 or as part of the first bonnet 88 that is coupled to the drain port 10. The valve member can include a handle 74 to help activate the valve to open the drain port to flush out any debris that has been collected by the screen 84. This permits the flushing of debris without the need to remove and/or isolate the water pressure regulator assembly 2 from the plumbing system. The use of a removable first bonnet 88 permits access to the screen 84 so that it can be cleaned or replaced. A cap 73 can be coupled to the first bonnet 88 as illustrated in FIG. 1.

A bell 17 is coupled to the bell base 14 of the valve body 4. The bell 17 can be coupled to the bell base 14 using a friction ring 40. Alternatively, the bell 17 can be coupled by fasteners and/or threaded engagement in addition to, or in place of, the use of a friction ring 40. A spring 42 is positioned adjacent to a diaphragm 48. A fastener 44 can be used with a bearing plate 46 to assist in the positioning of spring 42 with respect to the diaphragm 48. A spring spacer 41 can be used on the upper portion of the spring 42. A fastener 52 can be inserted through an opening in the bell 17 to adjust the spring 42 with respect to the diaphragm 48. This permits the adjustment of the tension that the spring 42 applies to the diaphragm 48 to restrict the water pressure in the valve body 4. Tightening the fastener 52 increases the tension on the spring 42 which reduces the pressure of the water as it exits the water pressure regulator assembly. Conversely, loosening the tension of the spring 42 will increase the outgoing water pressure. The diaphragm 48 includes a stem 49 that is received in stem opening 64 in the bell base 14. An O-ring 56 and a shim 58 may be used to position the stem 49 within the stem opening 64. In some embodiments, the fastener 52 may be adjusted by movement of nut 54 (FIG. 5) and/or by movement of a handle 50 (FIG. 1).

The gauge port 12 can be used to attach a pressure gauge 60, as shown in FIG. 1. A combination of gaskets 72, 76 and valve seals 74 can be used to help couple a straight bob 77 into the gauge port 12, as illustrated in FIG. 5. An additional gasket 78 can be used adjacent to the second bonnet 79. The pressure gauge 60 can be coupled to an opening in the second bonnet 79.

A first fitting 7 is coupled to the first fitting end 6. In the illustrated embodiment, the first fitting 7 couples to the first fitting end 6 by the engagement of a union fitting 90 onto the first fitting end 6. The first fitting 7 can be coupled by other types of couplings to the first fitting end 6. Similarly, the second fitting 9 can be coupled to the second fitting end 8 by a union coupling 90 or other type of coupling. The union coupling 90 may include a threaded surface. O-rings 97 can be used to help seal the coupling of the first fitting 7 and second fitting 9 to the fitting ends 6, 8. The fittings 7, 9 can include any type of fitting end such as male pipe thread, female pipe thread, sweat, press, push-to-connect, PEX, etc. The type and size of the fittings 7, 9 do not need to be the same. The use of union fittings 90 permits easy removal of the water pressure regulator assembly 2 from the plumbing system.

Check valve inserts 80 may be positioned in the first fitting 7 and/or second fitting 9. The check valve inserts 80 are positioned adjacent to an internal shoulder S. The check valve inserts 80 include a spring member that presses a stopper to seal the check valve insert 80 in one direction with respect to the fluid passageway. When the pressure of the fluid flow is sufficient to overcome the pressure of the spring, the stopper will compress the spring member and open the fluid passageway. Therefore, check valve inserts 80 can be used to restrict flow in one direction. Thus, as illustrated in FIGS. 2-3 and 6-8, the check valve inserts 80 can be used to restrict the flow of water within the valve body 4. The check valve inserts 80 prevent backflow of water into the incoming water supply. The check valve inserts 80 also allow for isolation and service of the water pressure regulator assembly 2 when the incoming water supply is turned off without the need to drain the entire plumbing system. The check valve inserts 80 can be removed if backflow isolation is not needed.

While the illustrated embodiments show the water pressure regulator assembly 2 having a threaded engagement with the drain port and associated valve assembly, the drain port section could be integrally formed within the remainder of the valve body 4 of the assembly. In addition, the pressure gauge port could be plugged and/or repositioned on the valve body. The valve body may be made of brass, including, but not limited to, dezincification brass (DZR).

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term “coupled” or “operably coupled” (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components.

Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention is claimed as follows:

1. A water pressure regulator assembly, comprising:
- a valve body having a fluid passageway between a first fitting end, a second fitting end, a drain port, a bell base, and a gauge port;
- a bell coupled to said bell base;
- a spring positioned within said bell;
- a diaphragm coupled to said spring, said diaphragm coupled to a valve stem that is positioned within a stem opening in said bell base;
- a screen member positioned within said drain port, said screen member including a portion that is positioned in said fluid passageway adjacent to said first fitting end;
- a first fitting coupled to said first fitting end by a union coupling;
- a second fitting coupled to said second fitting end by a union coupling;
- a first check valve insert positioned in said first fitting adjacent to an internal shoulder in said first fitting, said first check valve insert permitting water to flow toward said first fitting end, but not permitting water to flow from said first fitting end out of said first fitting; and
- a second check valve insert positioned in said second fitting adjacent to an internal shoulder in said second fitting, said second check valve insert permitting water to flow from said second fitting end to said second fitting, but not permitting water to flow from said second fitting to said second fitting end.

2. The water pressure regulator assembly of claim 1, including a friction ring positioned between said bell and said bell base.

3. The water pressure regulator assembly of claim 1, wherein said gauge port is positioned on said valve body opposite said stem opening.

4. The water pressure regulator assembly of claim 1, including a fastener coupled to a spring spacer that controls said spring.

5. The water pressure regulator assembly of claim 4, including a handle coupled to said fastener.

6. The water pressure regulator assembly of claim 1, wherein said drain port includes a valve member.

7. The water pressure regulator assembly of claim 6, wherein said drain port includes a female pipe thread end that couples to a male pipe thread on said valve member.

8. The water pressure regulator assembly of claim 1, wherein said first union fitting includes an O-ring that compresses against said first fitting end.

9. The water pressure regulator assembly of claim 1, wherein said second union fitting includes an O-ring that compresses against said second fitting end.

10. A water pressure regulator assembly, comprising:
- a valve body having a fluid passageway between a first fitting end, a second fitting end, a drain port, and a bell base;
- a bell coupled to said bell base;
- a spring positioned within said bell;
- a diaphragm coupled to said spring, said diaphragm coupled to a valve stem that is positioned within a stem opening in said bell base;
- a screen member positioned within said drain port, said screen member including a portion that is positioned in said fluid passageway adjacent to said first fitting end;
- a valve member positioned on said drain port;
- a first fitting coupled to said first fitting end by a union coupling;
- a second fitting coupled to said second fitting end by a union coupling;
- a first check valve insert positioned in said first fitting adjacent to an internal shoulder in said first fitting, said first check valve insert permitting water to flow toward said first fitting end, but not permitting water to flow from said first fitting end out of said first fitting; and
- a second check valve insert positioned in said second fitting adjacent to an internal shoulder in said second fitting, said second check valve insert permitting water to flow from said second fitting end to said second fitting, but not permitting water to flow from said second fitting to said second fitting end.

11. The water pressure regulator assembly of claim 10, including a friction ring positioned between said bell and said bell base.

12. The water pressure regulator assembly of claim 10, including a gauge port positioned on said valve body opposite said stem opening.

13. The water pressure regulator assembly of claim 10, including a fastener coupled to a spring spacer that controls said spring.

14. The water pressure regulator assembly of claim 13, including a handle coupled to said fastener.

15. The water pressure regulator assembly of claim 10, wherein said drain port includes a female pipe thread end that couples to a male pipe thread on said valve member.

16. The water pressure regulator assembly of claim 10, wherein said first union fitting includes an O-ring that compresses against said first fitting end.

17. A water pressure regulator valve assembly, comprising:

a valve body having a fluid passageway between a first fitting end, a second fitting end, a drain port, and a bell base;

a bell coupled to said bell base;

a spring positioned within said bell;

a diaphragm coupled to said spring, said diaphragm coupled to a valve stem that is positioned within a stem opening in said bell base;

a screen member positioned within said drain port, said screen member including a portion that is positioned in said fluid passageway adjacent to said first fitting end;

a first fitting coupled to said first fitting end by a union coupling;

a second fitting coupled to said second fitting end by a union coupling;

a first check valve insert positioned in said first fitting adjacent to an internal shoulder in said first fitting, said first check valve insert permitting water to flow toward said first fitting end, but not permitting water to flow from said first fitting end out of said first fitting; and a second check valve insert positioned in said second fitting adjacent to an internal shoulder in said second fitting, said second check valve insert permitting water to flow from said second fitting end to said second fitting, but not permitting water to flow from said second fitting to said second fitting end.

18. The water pressure regulator valve assembly of claim 17, including a friction ring positioned between said bell and said bell base.

19. The water pressure regulator valve assembly of claim 17, including a gauge port positioned on said valve body opposite said stem opening.

20. The water pressure regulator valve assembly of claim 17, wherein said drain port includes a valve member.

* * * * *